(12) United States Patent
Nishiyama et al.

(10) Patent No.: US 8,574,046 B2
(45) Date of Patent: *Nov. 5, 2013

(54) STORAGE APPARATUS AND COOLING METHOD FOR STORAGE APPARATUS

(75) Inventors: Shinichi Nishiyama, Ninomiya (JP); Yasuyuki Katakura, Odawara (JP); Tomohiro Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 817 days.

This patent is subject to a terminal disclaimer.

(21) Appl. No.: 12/172,334

(22) Filed: Jul. 14, 2008

(65) Prior Publication Data

US 2009/0294107 A1 Dec. 3, 2009

(30) Foreign Application Priority Data

May 27, 2008 (JP) ................................. 2008-138342

(51) Int. Cl.
*H05K 7/20* (2006.01)
*H05K 5/00* (2006.01)
F28D 15/00 (2006.01)

(52) U.S. Cl.
USPC ....... 454/184; 165/104.34; 361/694; 361/695

(58) Field of Classification Search
USPC ............... 454/184; 361/695, 694; 165/104.34
See application file for complete search history.

(56) References Cited

U.S. PATENT DOCUMENTS

| | | | | |
|---|---|---|---|---|
| 4,931,904 A | * | 6/1990 | Yiu | 361/695 |
| 6,452,789 B1 | * | 9/2002 | Pallotti et al. | 361/679.02 |
| 6,504,715 B2 | * | 1/2003 | Ota et al. | 454/184 |
| 6,643,123 B2 | * | 11/2003 | Hartel et al. | 454/184 |
| 6,768,640 B2 | * | 7/2004 | Doblar et al. | 454/184 |
| 6,816,368 B2 | * | 11/2004 | Yokosawa | 361/679.33 |
| 6,927,980 B2 | * | 8/2005 | Fukuda et al. | 361/700 |
| 6,948,012 B1 | * | 9/2005 | Valin et al. | 710/38 |
| 7,016,191 B2 | * | 3/2006 | Miyamoto et al. | 454/186 |
| 7,054,155 B1 | * | 5/2006 | Mease et al. | 361/695 |
| 7,061,715 B2 | * | 6/2006 | Miyamoto et al. | 361/679.33 |
| 7,127,798 B1 | * | 10/2006 | Reger et al. | 29/603.03 |
| 7,280,356 B2 | * | 10/2007 | Pfahnl et al. | 454/184 |
| 7,424,727 B2 | | 9/2008 | Tanaka et al. | |

(Continued)

FOREIGN PATENT DOCUMENTS

| | | |
|---|---|---|
| EP | 1746483 | 1/2007 |
| JP | 10141278 A * | 5/1998 |

(Continued)

OTHER PUBLICATIONS

Japanese Office Action dated Oct. 18, 2011, issued in corresponding Japanese Patent Application No. 2008-138342 with partial English language translation.

(Continued)

*Primary Examiner* — Steven B McAllister
*Assistant Examiner* — Phillip E Decker
(74) *Attorney, Agent, or Firm* — Brundidge & Stanger, P.C.

(57) ABSTRACT

Provided is a storage apparatus that uses a generally-used housing and allows storage devices mounted from two sides of the housing, in which a cooling device is provided in front of the storage devices and the cooling device is configured to be movable so as to open the front side of the storage devices so that maintenance and replacement of a storage device(s) can be performed from the two sides of the housing.

13 Claims, 20 Drawing Sheets

(56) References Cited

U.S. PATENT DOCUMENTS

| | | | | |
|---|---|---|---|---|
| 7,436,662 | B2* | 10/2008 | Gundlach | 454/184 |
| 7,859,839 | B2* | 12/2010 | Wada | 361/695 |
| 7,862,410 | B2* | 1/2011 | McMahan et al. | 454/184 |
| 7,916,471 | B2* | 3/2011 | Miyamoto et al. | 361/695 |
| 8,284,553 | B2* | 10/2012 | Cheng et al. | 454/184 |
| 8,432,700 | B2* | 4/2013 | Katakura et al. | 361/732 |
| 2004/0199719 | A1* | 10/2004 | Valin et al. | 711/114 |
| 2005/0111136 | A1* | 5/2005 | Miyamoto et al. | 361/695 |
| 2006/0025065 | A1* | 2/2006 | Belady et al. | 454/184 |
| 2006/0039108 | A1* | 2/2006 | Chikusa et al. | 361/695 |
| 2006/0123436 | A1* | 6/2006 | Tanaka et al. | 720/649 |
| 2006/0139877 | A1* | 6/2006 | Germagian et al. | 361/695 |
| 2006/0232914 | A1* | 10/2006 | Hori et al. | 361/676 |
| 2007/0006239 | A1* | 1/2007 | Kasahara et al. | 720/601 |
| 2007/0127207 | A1* | 6/2007 | Katakura et al. | 361/694 |
| 2007/0171613 | A1* | 7/2007 | McMahan et al. | 361/695 |
| 2008/0043426 | A1 | 2/2008 | Nishiyama et al. | |
| 2009/0002943 | A1* | 1/2009 | Peron et al. | 361/694 |
| 2010/0033922 | A1* | 2/2010 | Zwinger et al. | 361/695 |
| 2010/0041327 | A1* | 2/2010 | Desler | 454/184 |
| 2010/0053879 | A1* | 3/2010 | Miyamoto et al. | 361/679.31 |
| 2011/0143644 | A1* | 6/2011 | McMahan et al. | 454/184 |
| 2011/0149500 | A1* | 6/2011 | Miyamoto et al. | 361/679.31 |

FOREIGN PATENT DOCUMENTS

| | | | |
|---|---|---|---|
| JP | 2003036669 | | 2/2003 |
| JP | 2005228216 | | 8/2005 |
| JP | 2006163663 | | 6/2006 |
| JP | 2007-011931 | | 1/2007 |
| JP | 2008-047249 | | 2/2008 |
| JP | 2009117629 A | * | 5/2009 |
| WO | 0209113 | | 1/2002 |

OTHER PUBLICATIONS

European Search Report dated Sep. 2, 2011, issued in corresponding European Patent Application No. 08 25 3938.

* cited by examiner

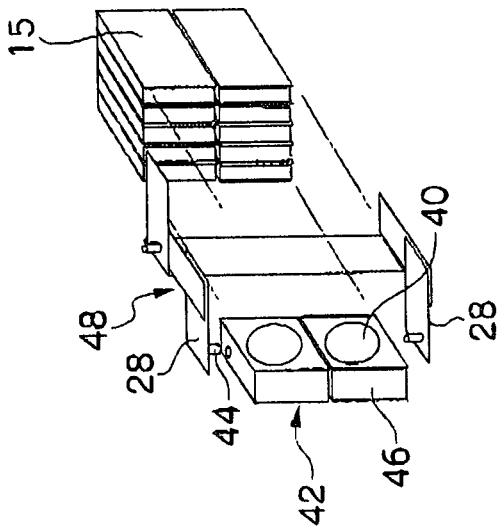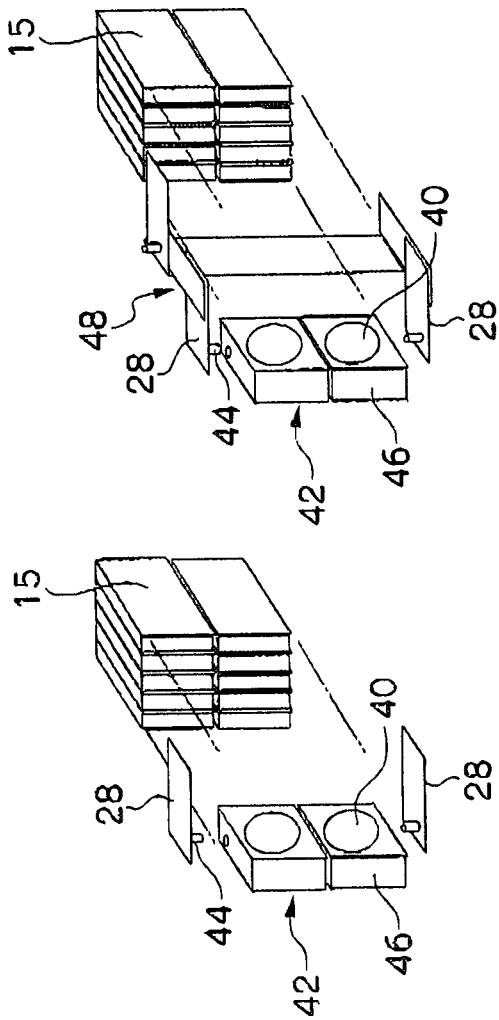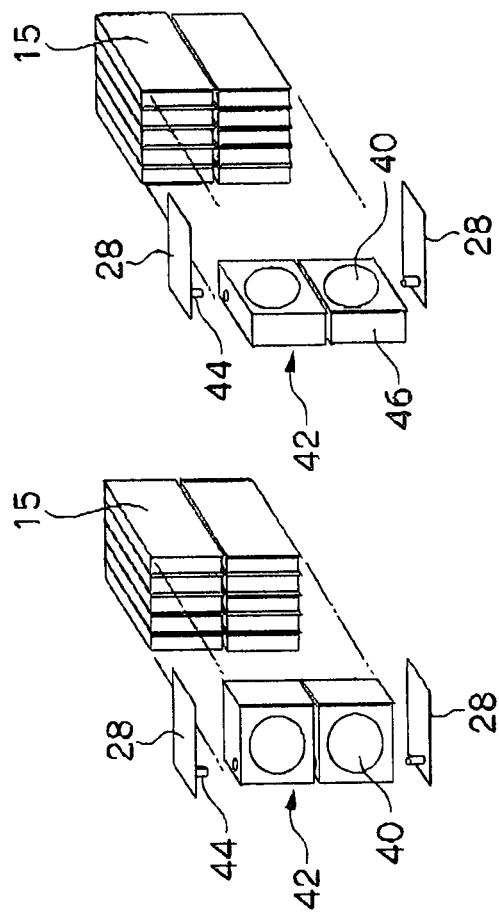

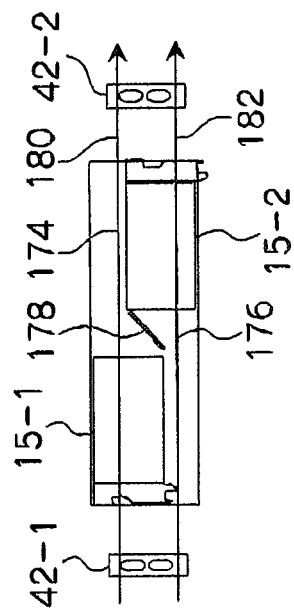
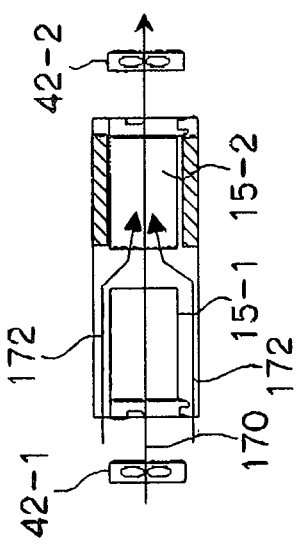

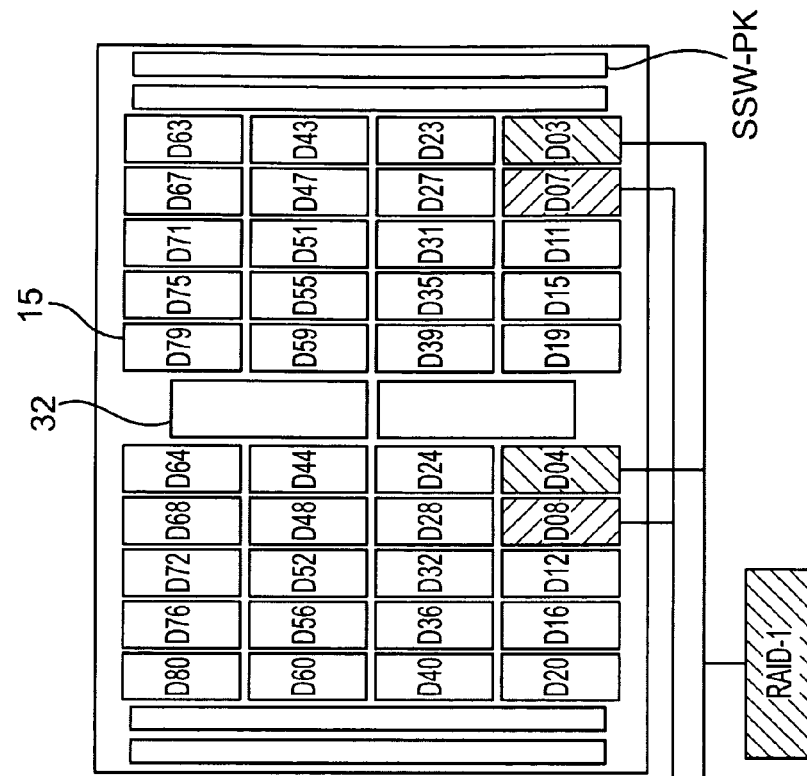
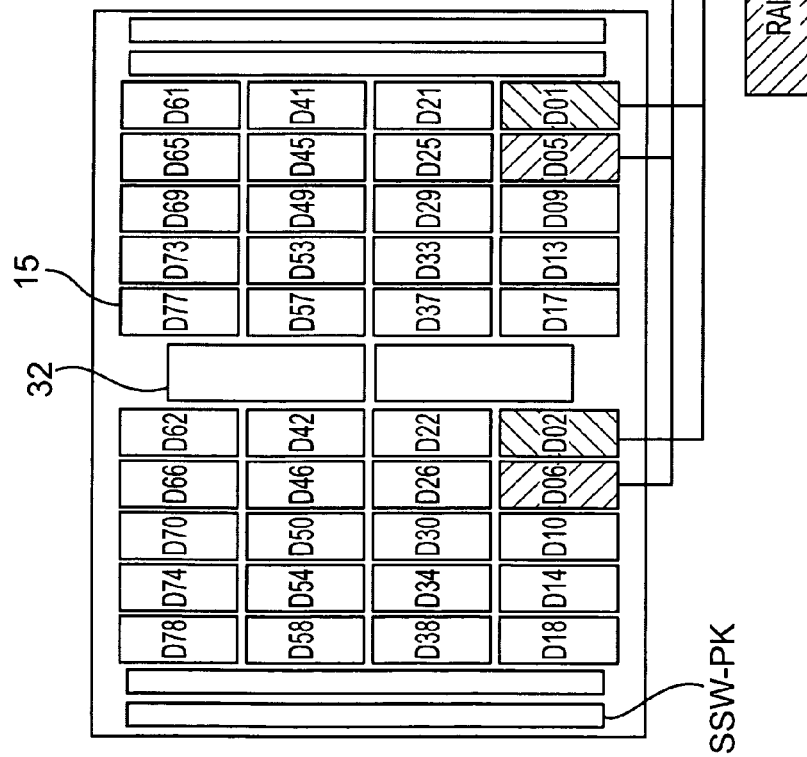

FIG.15

| RAID GROUP NO. | HDD No. |
|---|---|
| RAID-1 | D01 D02 D03 D04 |
| RAID-2 | D05 D06 D07 D08 |
| RAID-3 | D09 D10 D11 D12 |
| . | . |
| . | . |
| . | . |
| RAID-20 | D77 D78 D79 D80 |

REAR SIDE

FRONT SIDE

FIG.17

| FAN No. | HDD No. |
|---|---|
| F-1 | D01 D05 D09 D13 D17 |
| F-2 | D21 D25 D29 D33 D37 |
| F-3 | D41 D45 D49 D53 D57 |
| . | . |
| . | . |
| . | . |
| F-16 | D64 D68 D72 D76 D80 |

FIG.18

| 1P (PARITY)-HDD | 3D (DATA)-HDD | LOCKOUT HDD No. | STOP FAN No. |
|---|---|---|---|
| D01 | D02 D03 D04 | D01 | F1 |
| | | D02 | F5 |
| | | D03 | F9 |
| | | D04 | F13 |
| D05 | D06 D07 D08 | D05 | F1 |
| | | D06 | F5 |
| | | D07 | F9 |
| | | D08 | F13 |
| . | . | . | . |
| . | . | . | . |
| . | . | . | . |
| D77 | D78 D79 D80 | D77 | F4 |
| | | D78 | F8 |
| | | D79 | F12 |
| | | D80 | F16 |

STORAGE APPARATUS AND COOLING METHOD FOR STORAGE APPARATUS

CROSS-REFERENCES TO RELATED APPLICATIONS

This application relates to and claims priority from Japanese Patent Application No. 2008-138342, filed on May 27, 2008, the entire disclosure of which is incorporated herein by reference.

BACKGROUND

1. Field of the Invention

The present invention relates generally to a storage apparatus and its cooling method, and more specifically to a storage apparatus in which hard disk drives are housed in a generally-used housing from two sides of the housing, and a cooling method for such a storage apparatus.

2. Description of Related Art

A system handling data on a large scale, as one provided in a data center or similar, manages data using a host computer and a storage apparatus. The storage apparatus includes hard disk drives arranged in an array and protects data using a RAID system.

In relation to the increase of an amount of data handled in a storage apparatus, the number of hard disk drives installed in the storage apparatus is increasing. For example, JP2008-47249 discloses a storage apparatus having a housing dedicated to housing a large number of hard disk drives.

This type of storage apparatus has cooled the hard disk drives by supplying air to the housing from a surface of the housing and having the air flow in a flow path formed in the housing, and then expelling the air from a top surface of the housing.

On the other hand, there is also a storage apparatus that does not have a dedicated housing, but instead has a generally-used rack that enables a user to add, as needed, modules having hard disk drives to the rack (see, JP2007-11931 A).

This type of storage apparatus cannot be provided with an exhaust fan on a top surface of the rack, and in addition, cannot be provided with an airflow path in the rack, so it has had a structure in which a module including a power source and a fan integrally in the hard disk drive is housed in the rack.

The module is inserted in the rack in such a manner that the hard disk drive is located on a front side of the rack. The air is introduced from a front side of the module into the rack and expelled from a rear side of the module.

Also in the storage apparatus using the housing with the generally-used rack, the number of hard disk drives mounted in the housing increases as the amount of handled data increases. In order to increase the mount density of hard disk drives when the hard disk drives are stacked up in the housing, the size of the housing needs to be increased so that it can house a higher stack of the hard disk drives.

In light of the above circumstances, a more preferable type would be those allowing the hard disk drives to be inserted from both the front and rear sides of the housing to increase the mount density of the hard disk drives.

It is difficult to mount conventional modules in the housing from both the front and rear sides of the housing, since the size of the modules is too great. A possible solution for this problem would be to provide a fan at least on one of both the front and rear sides of the housing, instead of incorporating the fan in the modules, and to cool the hard disk drives that have been mounted in the housing from both the front and rear sides of the housing.

However, if the fan is provided on the front side in the housing, the fan will be an obstacle to maintenance and replacement of the hard disk drive(s) in the housing.

Also, because air with an increased temperature after passing through the hard disk drives located on the front side in the housing passes through the hard disk drives located on the rear side in the housing, cooling performance for the hard disk drives on the rear side in the housing is insufficient.

In view of the foregoing, in the storage apparatus employing the generally-used housing, hard disk drives have not been mounted from both the front and rear sides of the housing.

It is an object of the present invention to provide a storage apparatus that houses storage devices in a housing by mounting them in the housing from both front and rear sides of the housing and that enables maintenance and replacement of the storage device(s) even if a cooling device is provided at a position facing the storage devices.

It is another object of this invention to provide a storage apparatus having an excellent cooing performance for storage devices that are mounted in a housing from both the front and rear sides of the housing.

It is another object of this invention is to provide a cooling method for efficiently cooling the storage apparatus that houses, in a housing, storage devices mounted from both the front and rear sides of the housing.

SUMMARY

Provided according to an aspect of this invention is a storage apparatus that houses in a generally-used housing storage devices mounted from two sides of the housing, in which a cooling device is provided on a front side of the storage devices, the cooling device being adapted to be movable to open the front side of the storage devices so that maintenance or replacement of the storage device(s) can be performed from the two sides of the housing.

Provided according to another aspect of this invention is a storage apparatus provided with an airflow, in which, even if storage devices are mounted in a generally-used housing from the two sides of the housing, the air introduced from the outside in the housing is supplied to storage devices facing a rear side of the housing not via storage devices facing a front side of the housing.

This invention can provide a storage apparatus that employs a generally-used housing and houses storage devices mounted from the two sides of the housing, in which maintenance and replacement of the storage device(s) can be performed even if a cooling device is provided at a position facing the storage devices.

This invention can also provide a storage apparatus having excellent cooling performance for the storage devices mounted in the housing from the two sides of the housing.

In addition, this invention can provide a cooling method that can efficiently cool the storage apparatus in which the storage devices are mounted from the two sides of the housing.

Other aspects and advantages of the invention will be apparent from the following description and the appended claims.

BRIEF DESCRIPTION OF THE DRAWINGS

FIGS. 4A to 4C are perspective views each showing the process in which a cooling device is rotated on a front side of the module.

FIGS. 13A and 13B are schematic diagrams showing temperature change in an air flow supplied in the housing.

FIGS. 14A and 14B are a front view and a rear view, respectively, showing a module, in which RAID groups are formed by hard disk drives on the front side and hard disk dives on the rear side.

FIG. 15 is a management table for RAID groups.

FIG. 17 is a management table showing correspondence between the fans and the hard disk drive.

FIG. 18 is a management table that specifies hard disk drives included in a RAID group and a fan to be stopped when a certain hard disk drive in the RAID group is locked out.

DETAILED DESCRIPTION OF PREFERRED EMBODIMENTS

Figure 1:
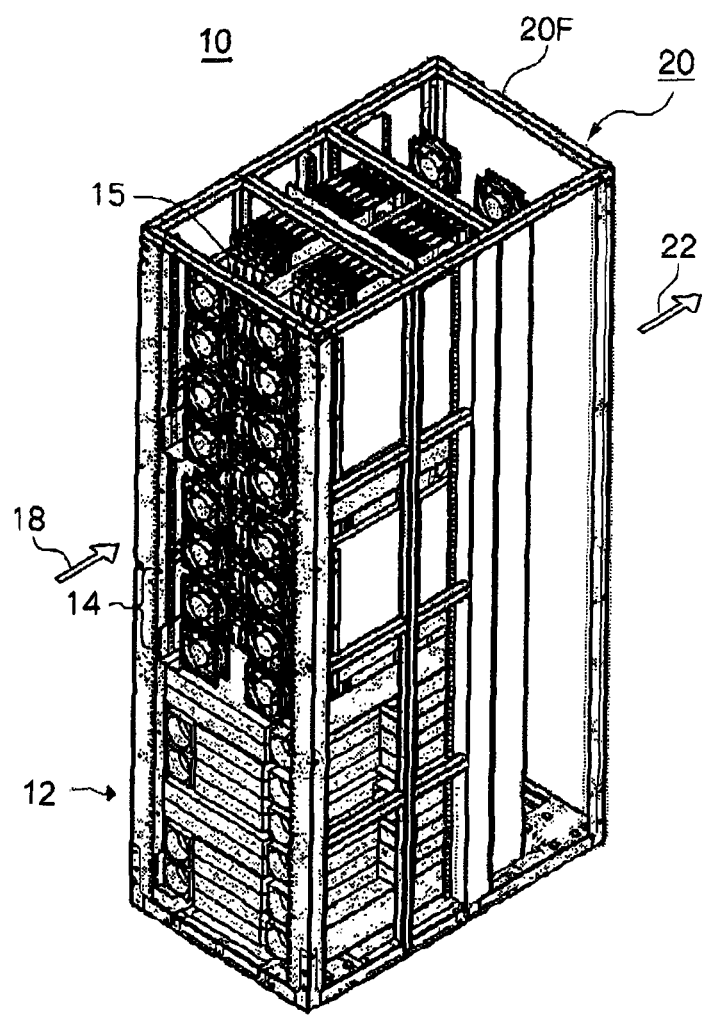
FIG. 1 is a perspective view showing the whole of a storage apparatus according to an embodiment of this invention.

An embodiment of this invention will be described with reference to the attached drawings. FIG. 1 is a perspective view showing the whole of a storage apparatus 10. The storage apparatus 10 has a rectangular shape as a whole and has a rack-mount type housing (rack) 20 that has a frame 20F. The housing 20 is adapted to be placed on a floor and has a rectangular-parallelepiped shape having a height almost equal to the average human height. A "rack" is a generic name for cabinets used for storing industrial articles and the rack is configured with shelves and supports.

The housing 20 has a space inside in which a user can mount, in the frame, a control unit and a storage unit including a plurality of hard disk drives. The control unit (DKC: Disk Control) 12 processes IOs from a host computer and executes a write request or a read request to the storage unit (DKU: Disk Unit) including the plurality of hard disk drives (storage devices).

A DKC 12 is mounted in a lower part of the housing 20. The hard disk drive unit (DKU) is mounted in an upper part, extending from near the middle part to the top, in the housing 20. The DKU is configured by a plurality of modules 14 that are sequentially mounted in a space above the DKC in the housing 20.

The modules 14 each have a plurality of hard disk drives 15. The modules 14 are mounted in the housing 20 from a front side of the housing 20 as shown by the arrow 18 and from a rear side of the housing 20 as shown by the arrow 22.

Figure 2:
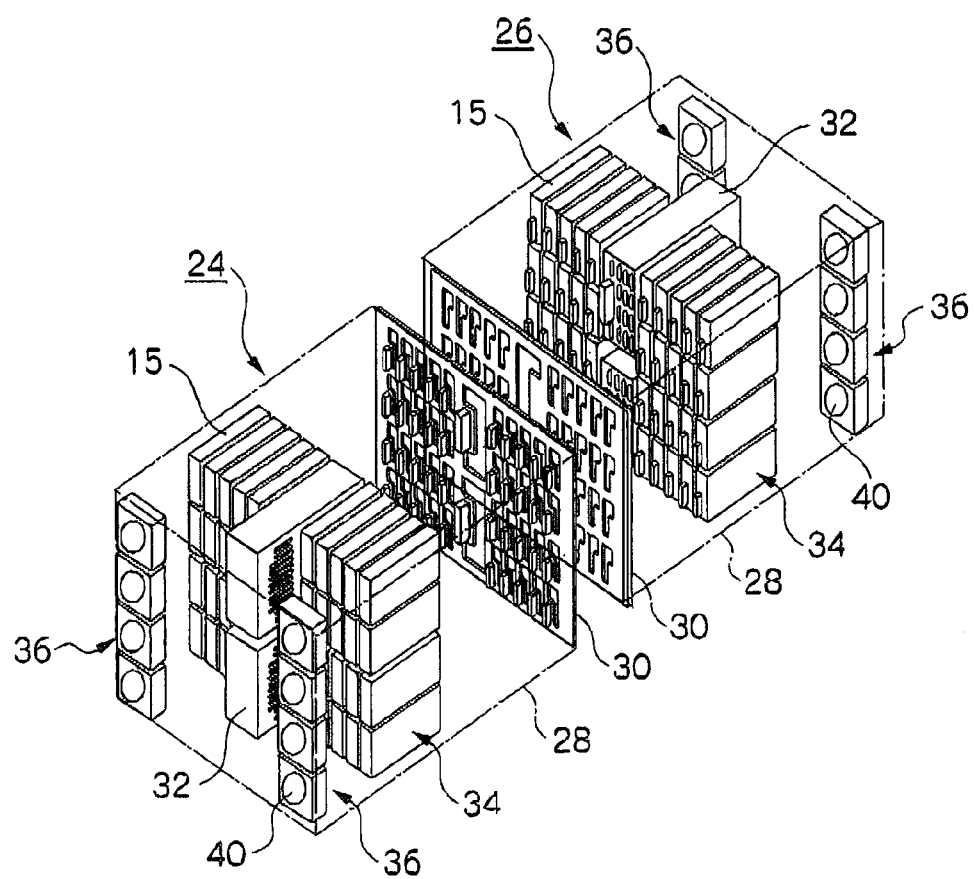
FIG. 2 is an exploded perspective view showing modules each having hard disk drives.

FIG. 2 is an exploded perspective view showing the module having the hard disk drives 15. FIG. 2 shows a pair of modules 24 and 26 respectively inserted from the front side and rear side of the housing 20 into the space in the housing 20 and mounted in the frame. The module 24 and the module 26 have a common configuration.

Figure 20:
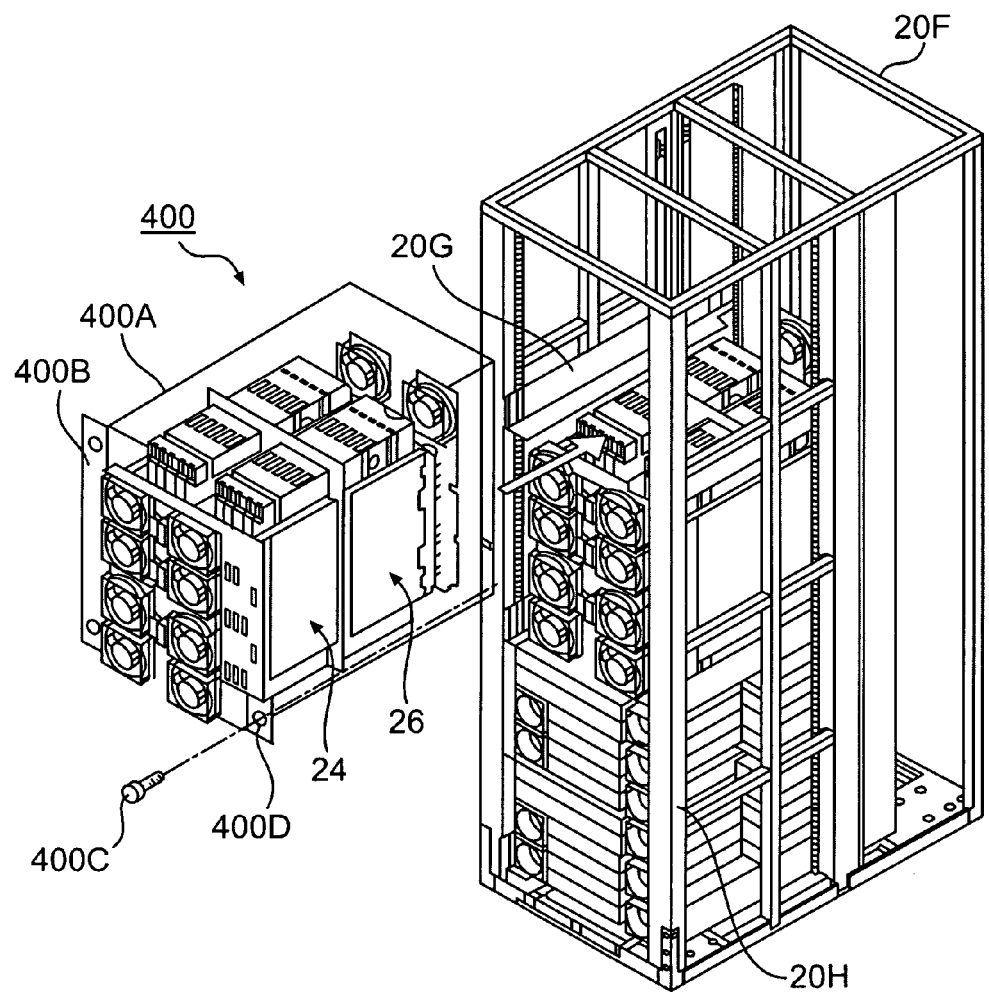
FIG. 20 is a perspective view showing how module structures are housed in the housing.

As shown in FIG. 20, a module structure 400 configured by the pair of modules 24 and 26 and a case 400A for housing them is inserted into the housing 20 having the frame 20F as shown by the arrow. The module structure 400 is fixed by placing it on a pair of right and left guides 20G provided in an anteroposterior direction of the housing 20 and screwing a flange 400B of the module structure 400 to a front frame 20H of the housing 20 using a screw 400C through a screw hole 400D formed in the flange 400B. The front and rear sides of the case 400A are opened and the pair of modules is exposed from the open sides.

The modules 24 and 26 each have a structure in which a platter (back board) 30, power source units 32, a storage unit 34 configured by the plurality of hard disk drives 15 and cooling devices 36 are incorporated in a chassis shown by the alternating long-and-short dashed line 28.

The platter 30 includes a circuit pattern for supplying power from the power source units 32 to the storage unit 34 and the cooling devices 36. The platter 30 is located on the innermost side of the chassis 28, and the power source units 32 and the hard disk drives 15 are connected to the platter 30. In FIG. 2, the hard disk drives 15 and the power source units 32 are spaced apart from the platter 30 for convenience of explanation.

The power source units 32 are located at a position corresponding to the center of the platter 30. The power source units 32 are provided in a pair in a vertical direction of the modules 24 and 26, and if a failure occurs in one of the power source units 32, the other power source unit 32 supplies electric power.

In the module 24 (26), the plurality of hard disk drives 15 are arranged uniformly in matrixes and the matrixes of the hard disk drives 15 are placed around the pair of power source units 32. Each hard disk drive 15 is connected to the platter 30. The hard disk drives 15 are longitudinally mounted with respect to the chassis 28 so that a large number of hard disk drives can be housed in the chassis 28.

The module 24 shown in FIG. 2 is mounted in the space inside the housing 20 from the front side (the side shown by the reference numeral 18) of the housing 20 shown in FIG. 1. Also, the module 26 is mounted in the space inside the housing 20 from the rear side (the side shown by the reference numeral 22) of the housing 20.

The modules 24 and 26 are mounted in the housing 20 in such a manner that they are stacked up in the vertical direction of the housing 20. Note that the chassis is omitted in FIG. 1 for convenience of explanation.

The above-mentioned cooling devices 36 are provided on both right and left sides of the front side in the chassis 28. The cooling devices each have a structure in which a plurality of fans 40 is aligned in the vertical direction of the chassis 28.

Fans 40 in the module 24 located on the front side in the housing 20 rotate in a direction in which the air outside the housing 20 is introduced into the housing 20, while fans 40 in the module 26 located on the rear side in the housing 20 rotate in a direction in which the air inside the housing 20 is expelled to the outside of the housing 20.

The module 24 (26) is configured so that the hard disk drives 15 are arranged on both of the right and left sides of the power source units 32, and in addition, the cooling devices 36 are arranged on the right and left sides in the chassis 28 in order to mainly cool the hard disk drives 15 which emit more heat than the power source units 32 do.

As shown in FIG. 2, the pair of modules 24 and 26 located on the front and rear sides in the housing 20 are inserted into the housing 20 respectively from the front side and rear side of the housing 20 in such a manner that their platters 30 directly face each other.

By moving the cooling devices 36 located on the front side in the module away from the storage unit 34, the front side of the storage unit 34 in the module 24 (26) is opened. By doing so, the hard disk drives 15 can be detached from the platter 30 and taken out of the module 24 (26).

A mechanism for sliding and/or rotating the cooling devices 36 is provided in order to open the front side of the storage unit 34. In order to enable the cooling devices 36 to rotate, the module 24 supports the cooling devices 36 with shafts at the right and left sides in the chassis 28. The cooling devices 36 rotate about the shafts. The same applies to the module 26.

The arrangement in which the power source units 32 are arranged on the center of the platter 30 and the plurality of hard disk drives 15 are arranged on the right and left sides of the power source units 32 can reduce the total length of power supply circuit patterns from the power source units to the hard disk drives 15 and so prevents any need for a large platter. Note that, in an arrangement in which power source units are arranged on ends of the platter, the total lengths of the power supply circuit patterns will increase and resistance will also increase, so a larger or thicker platter will accordingly be required.

Figure 3C:
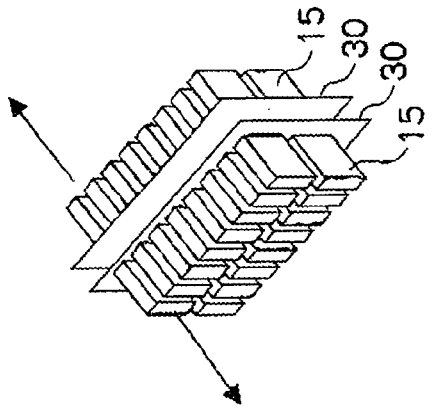
FIGS. 3A to 3C are perspective views each showing the outline of an arrangement example of plural hard disk drives in the module.
Figure 3B:
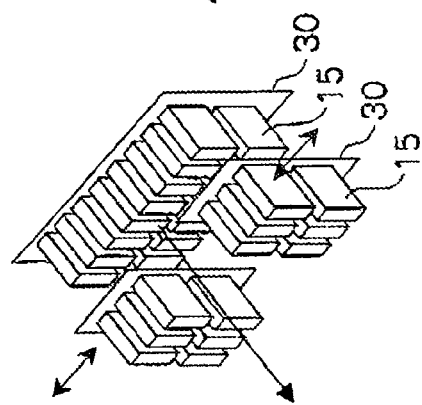
Figure 3A:
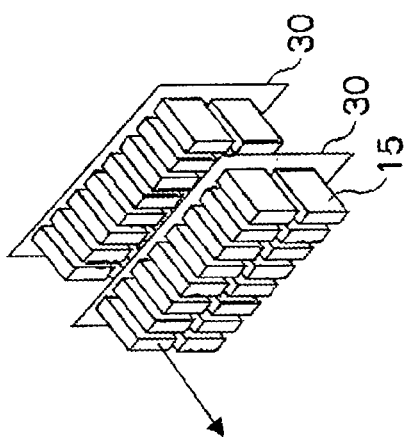

FIGS. 3A to 3C are perspective views each showing the outline of an arrangement example for the plurality of hard disk drives 15 in the modules 24 and 26. FIG. 3A shows an example in which the orientation of the plurality of hard disk drives 15 located on the front side and connected to the platter 30 and those located on the rear side and connected to the platter 30 are arranged in a common direction. In this arrangement, the hard disk drives 15 on the rear side cannot be removed from the front side of the housing 20, as shown by the arrow.

FIG. 3B shows an arrangement in which an area not occupied by the hard disk drives 15 is provided on the front side of the housing 20 and the position of this area can be moved by moving the front-side hard disk drives 15 rightward and leftward as shown by the arrows so that the rear-side hard disk drives 15 can be replaced via this area. However, the mount density of the front-side hard disk drives 15 is lowered in this arrangement.

In FIG. 3C, i.e., as shown in FIG. 2, modules are arranged in the front side and rear side in the housing 20 so that the front-side hard disk drives and the rear-side hard disk drives respectively face a front surface and a rear surface of the housing.

As shown in FIG. 2, provided near the right and left ends of the module 24 (26) are the cooling devices 36 that are each aligned along the vertical direction of the module 24 (26) and that each have a height almost equal to the height of the module 24 (26). The cooling devices 36 are arranged so as to face the plurality of hard disk drives 15 aligned in the vertical direction of the module 24 (26).

As shown in FIG. 4, a fan unit 42 (serving as the cooling device) including the plurality of fans is rotatably supported by a shaft 44 extending at the right angle from the chassis 28 toward the fan unit 42 in an area near a lateral end of the chassis 28 by fitting the shaft 44 in a groove formed in the fan unit 42. The fan unit 42 rotates about the shaft 42 so that the front side of the hard disk drives 15 can be opened. In FIGS. 4A to 4C, the chassis 28 is simplified, and only a part of the hard disk drives 15 is shown in order to help understanding of the positional relationship between the chassis 28 and the hard disk drives 15.

FIG. 4A shows the state in which the fan unit 42 faces the hard disk drives 15. FIG. 4B shows the state in which the fan unit 42 has been rotated around the shaft 44.

In the state shown in FIG. 4B, the fan unit 42 has been rotated on the front side of the hard disk drives 15 and the front side of the hard disk drives 15 are substantially opened but not completely, so a part of the front side of the hard disk drives 15 is blocked by a lateral surface 46 of the fan unit 42 and is left as a dead space, which will be an obstacle to maintenance and replacement operations for the hard disk drive(s).

In light of the above problem, as shown in FIG. 4C, hinges 48 are provided between the fan unit 42 and the chassis 28. In this configuration, the hinges 48, by rotating and expanding, move the fan unit 42 away from the front side of the hard disk drives 15, so the above-described dead space can be eliminated.

Figure 5A:
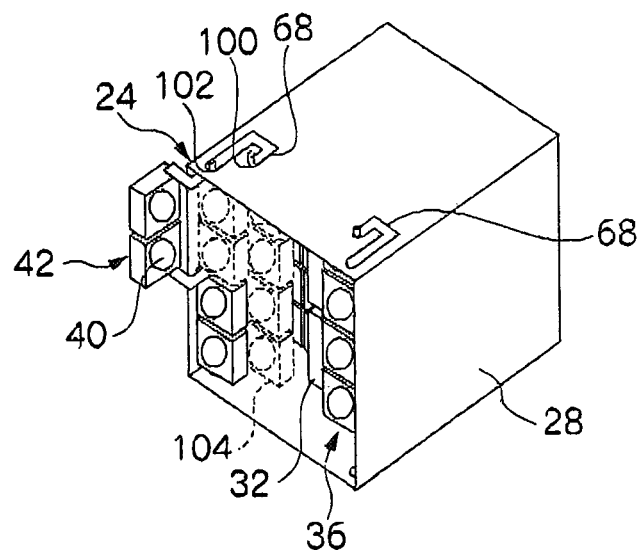
FIGS. 5A and 5B are perspective views each showing how the cooling device is supported by the module.
Figure 5B:
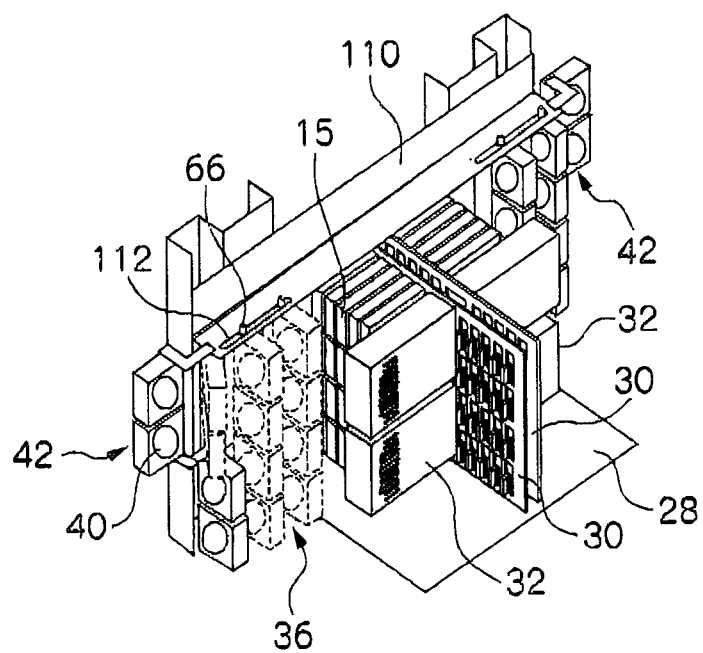

Two examples of support forms for supporting the cooling devices in the chassis 28 are shown in FIGS. 5A and 5B. FIG. 5A shows a form in which the cooling devices 36 are attached to the chassis 28 and FIG. 5B shows a form in which the cooling devices 36 are not directly attached to the chassis 28 but via a reinforcing body or an intermediate body such as a rail 110. In order to emphasize the rail 110, surfaces other than the bottom surface of the chassis 28 are not shown in FIG. 5B.

Examples of the mechanism for moving the cooling devices 36 away from the module 24 (26) from position 104 include a mechanism for sliding the cooling devices 36 relative to the module 24 (26) and a mechanism for rotating the cooling devices 36 relative to the module 24 (26).

Figure 6:
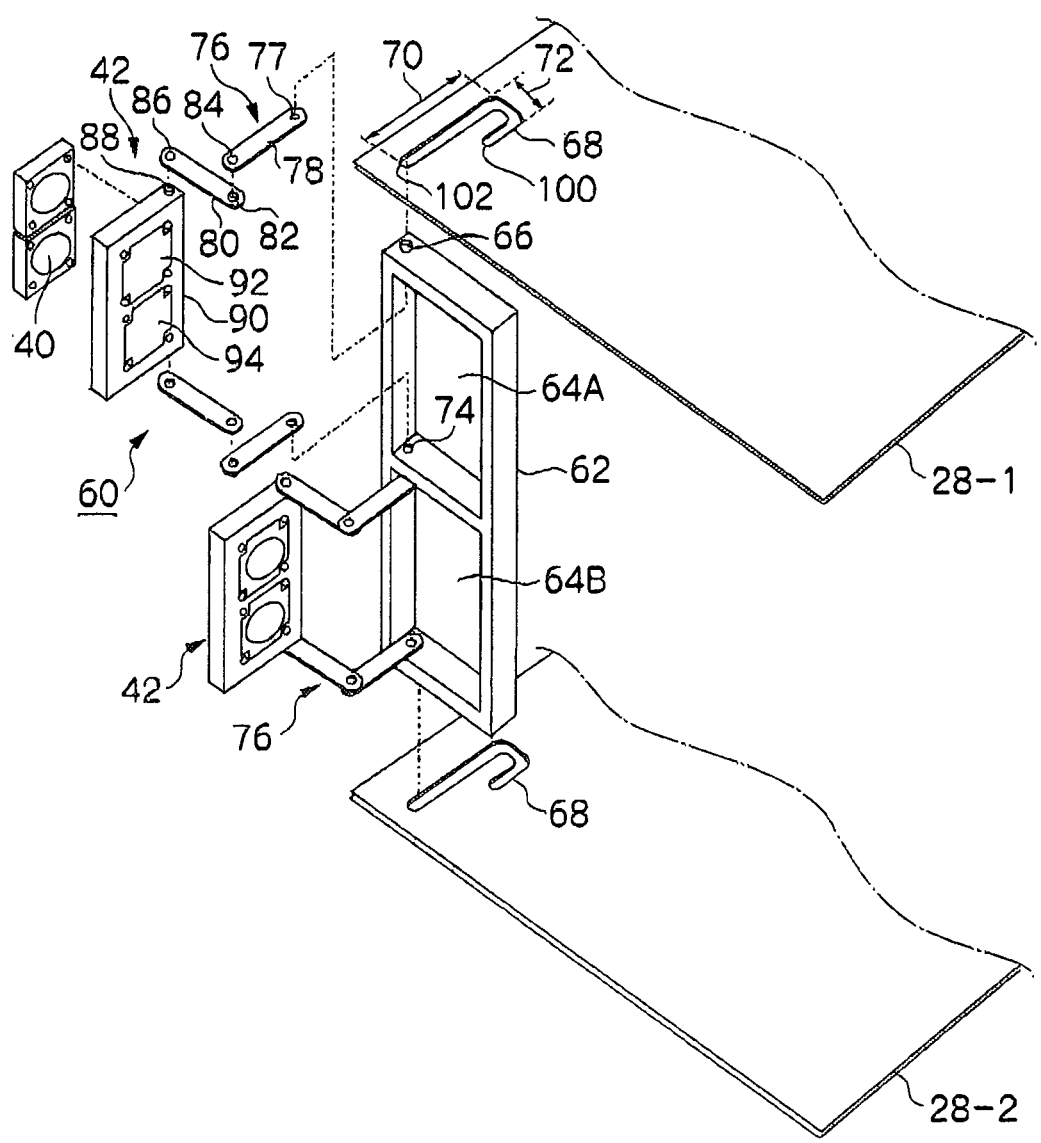
FIG. 6 is an exploded perspective view showing the cooling device in FIG. 5A.

FIG. 6 is an exploded view showing the cooling device 60 in FIG. 5A in detail. The reference numeral 62 in FIG. 6 denotes a first frame having a rectangular shape and supporting the fan unit 42. The reference numeral 28-1 denotes a top surface of the chassis 28 and the reference numeral 28-2 denotes a bottom surface of the chassis 28. The first frame 62 has two open spaces 64A and 64B which each house the fan unit 42.

Short shafts 66 project from an upper left end and a lower left end of the first frame 62 in the vertical direction of the chassis 28. The pair of upper and lower short shafts 66 are fit in guide grooves 68 provided near front left ends of the top and bottom surfaces of the chassis 28. The guide grooves 68 each have a substantial J-shape, extending from the front side toward the rear side and then curving back toward the front side in the chassis 28. The short shafts 66 and the guide grooves 68 realize a slide mechanism for sliding the cooling device 60 along the arrows 70 and 72.

Small shafts 74 project, near left ends in the two open spaces in the first frame 62, at right angles from an upper end and a lower end toward the open spaces. The pair of upper and lower small shafts 74 projecting toward each open space are provided with hinges 76 that support the fan unit 42 with respect to the first frame 62. The hinges 76 are coupled respectively to an upper end and a lower end of the fan unit 42. Note that, in FIG. 6, the upper one of the two fan units 42 is shown as an exploded view.

The hinges 76 are each configured by a first small piece 78 and a second small piece 80. An opening 77 formed in a tip end of the first small piece 78 is fit with the upper small shaft 74 of the open space in the first frame 62 and then a projecting shaft 82 on a tip end of the second small piece 80 is fit in an opening 84 formed in the rear end of the first small piece 78. An opening 86 formed in the rear end of the second small piece 80 is fit with a small projection 88 formed on an upper left end of a second frame 90 included in the fan unit 42. In this way, the upper end of the fan unit 42 and the rotation shaft 74 are coupled to each other by the hinges 76. Likewise, the hinge 76 is coupled to the lower end of the fan unit 42.

The fan unit 42 has a structure in which two fans 40 are fixed respectively in open spaces 92 and 94 in the second frame 90. The pair of upper and lower fan units 42 is coupled to the first frame 62 by the hinges 76. Accordingly, four fans are located on the front side of the hard disk drives 15, on each of the right and left sides in the module 24 (26), to cool the hard disk drives 15.

In FIGS. 5A and 6, the reference numeral 100 denotes a first end of each of the upper and lower guide grooves 68, and the optimum positioning for the fan units 42 can be obtained when the first frame 62 is located in this end. The optimum position for the fan units 42 is a position where the noise generated from the fans can be reduced by advancing toward the inner side of the module and where the fan units 42 can efficiently cool the plurality of hard disk drives 15 arranged in the width direction of the module 24 (26) and the power source units 32 located in the center of the module by advancing further toward the hard disk drives 15 and then advancing by the distance indicated by the arrow 72 in FIG. 6.

Figure 7:
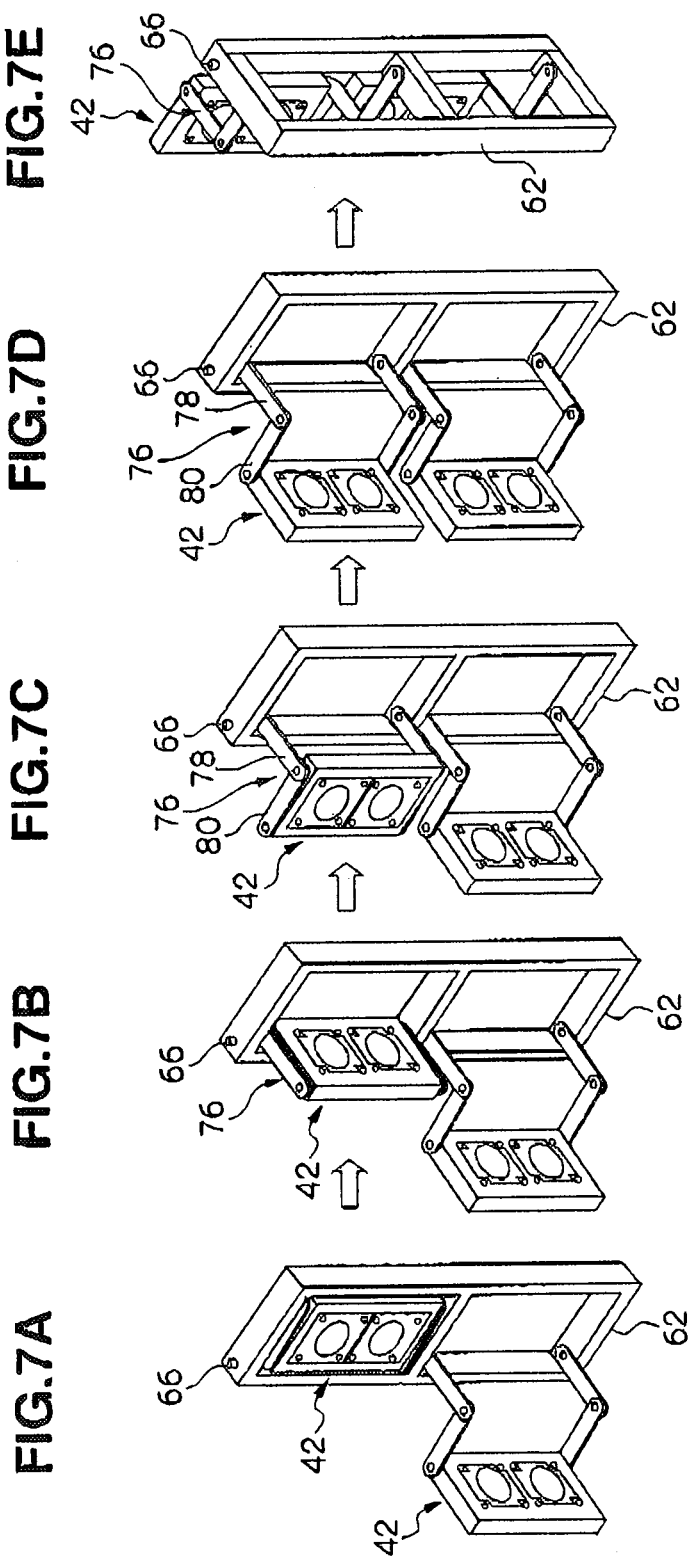
FIGS. 7A to 7E are perspective views showing, in an enlarged manner, how the cooling device is rotated on the front side of the module.

The user slides the cooling device 36 to a second end 102 of each guide groove 68 and then rotates the fan unit 42 so as to open the front side of the hard disk drives 15. This process will be described with reference to FIG. 7.

As shown in FIGS. 7A and 7B, the fan unit 42 is rotated with the hinges 76 with respect to the first frame 62. Then the second small pieces 80 are rotated with respect to the first small pieces 78 (FIG. 7C)).

Next, by rotating the fan unit 42 with respect to the second small pieces 80, the hinges 76 are sufficiently expanded, so the fan unit 42 is spaced apart from the front side of the module 24 (26) and the front side of the hard disk drives 15 is opened wide (FIG. 7D). Then by rotating the first frame 62 about the short shaft 66 with respect to the chassis 28 (FIG. 7E), an obstacle for the maintenance and replacement of the hard disk drive(s) can be eliminated.

The four fans 40 in the cooling device 36 are divided into two upper and lower pairs by the fan units 42. This configuration is employed because, if all of the four fans are fixed in one fan unit 41, the four fans are moved away from the hard disk drives 15 at the same time when maintenance or replacement of hard disk drive(s) is performed, so hard disk drives 15 that are not targeted for maintenance or replacement will not be cooled sufficiently. On the other hand, a configuration in which one fan is rotatable about one first frame 62 will be complicated.

In the state shown in FIG. 5(B), linear guide grooves 112 are formed in the pair of upper and lower rails 110 and the small shafts 66 on the first frame 62 are fitted in the grooves 112. When the cooling device 36 is positioned at base ends of the guide grooves 112, it is closest to the hard disk drives 15 and can cool the hard disk drives 15 efficiently.

When the hard disk drive(s) is (are) replaced, the user moves the cooling device 36 to tip ends of the guide grooves 112 and then rotates the fan units 42 to move them away from the front side of the hard disk drives 15.

In FIGS. 5A and 56, the first frame is omitted. Since the fan units 42 are detachable from the module 24 (26) via the hinges 76, the fan units 42 are also replaceable. In FIGS. 5A and 5B, the fan units 42 after the movement are shown by the solid line, while the fan units 42 before or during the movement are shown by the broken line.

Figure 8:
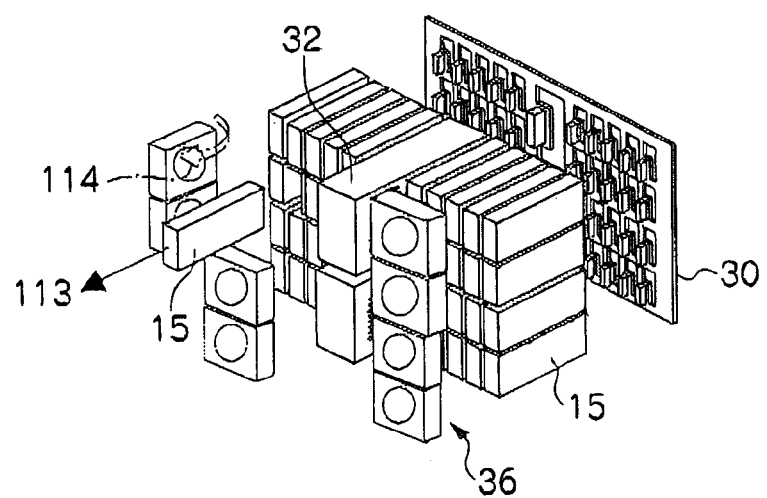
FIG. 8 is a perspective view showing the state in which a fan unit opens an area on a front side of hard disk drives and the hard disk drives can be removed from the module toward the front side.

FIG. 8 shows the state in which the fan units 42 open an area in front of the hard disk drives 15 so the hard disk drive(s) 15 can be removed from the module 24 (26) in a direction shown by the arrow 113.

The front side of the hard disk drives 15 is opened by rotating the fan units 42 along the curved arrow 114. The hard disk drive(s) 15 can be removed from the housing 20 via the opened area.

The hard disk drives 15, each oriented longitudinally relative to the module, are arranged in a matrix (4 rows in the vertical direction×5 columns in the horizontal direction) on both the right and left sides of the power source units 32, so forty hard disk drives 15 in total are housed in the module 24 (26). For example, when a hard disk drive in the upper two columns in the left matrix is to be replaced, the upper one of the two fan units 42 arranged vertically is rotated as shown in FIG. 8.

Figure 9:
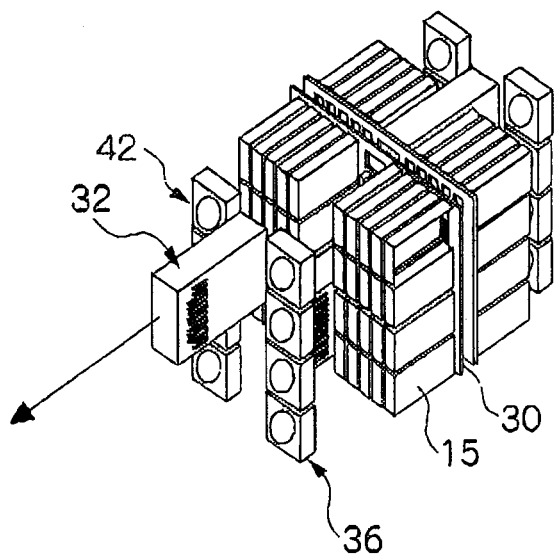
FIG. 9 is a perspective view showing the state in which a power source unit can be pulled out from the module toward the front side.

As shown in FIG. 8, since the power source unit 32 is located in the center of the plurality of hard disk drives 15 and no fan unit 42 is provided on the front side of the power source unit 32, the power source unit 32 can be removed from the module as shown by the arrow in FIG. 9, without any need for changing the positions of the fan units 42.

As described earlier, the fan units 42 are supported by the shafts at the right and left ends of the module 24 (26) in order to have the fan units 42 rotatable relative to the module 24 (26). As a result, the fan units are not located on the front side of the power source units positioned at the center of the module, so anxiety that the cooling for the power source units may not be sufficient still remains.

In light of these circumstances, as shown in FIG. 2, the power source units 32 project, relative to front ends of the hard disk drives 15, toward the cooling device 36 so that the power source units 32 can be cooled by providing the outside air from the cooling device 36 to the lateral surfaces of the power source units 32.

Figure 10:
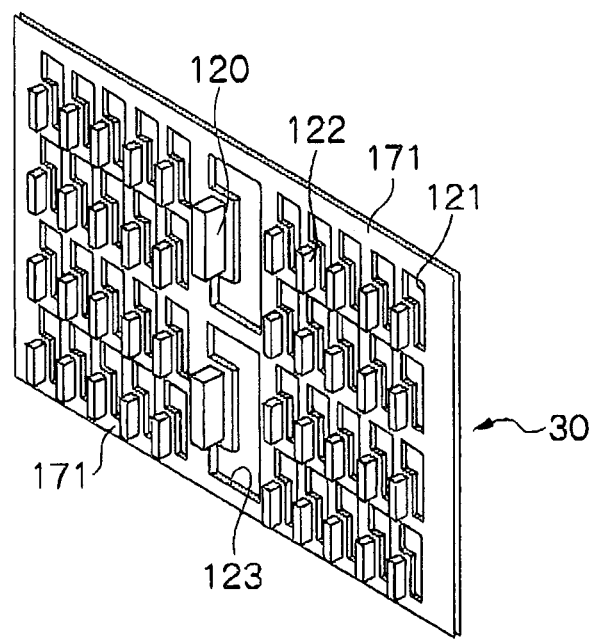
FIG. 10 is a perspective view showing a platter.

FIG. 10 is a perspective view showing the above-described platter 30. Platters that have conventionally been provided to respective hard disk drives 15 are integrated into one platter 30 and the center of the platter 30 is provided with a pair of upper and lower sockets 120 for the power source units (hereinafter referred to as "power-source unit sockets"). The power source units 32 are connected to these sockets 120.

A plurality of sockets 122 for the hard disk drives 15 (hereinafter referred to as "hard disk drive socket") are evenly arranged on the right and left sides of the power-source unit sockets 120. By inserting the power source units 32 into the power-source unit sockets 120, power for driving the hard disk drives 15 is supplied to each of the plurality of hard disk drive sockets 122 by the power supply circuit pattern in the platter 30.

Figure 11A:
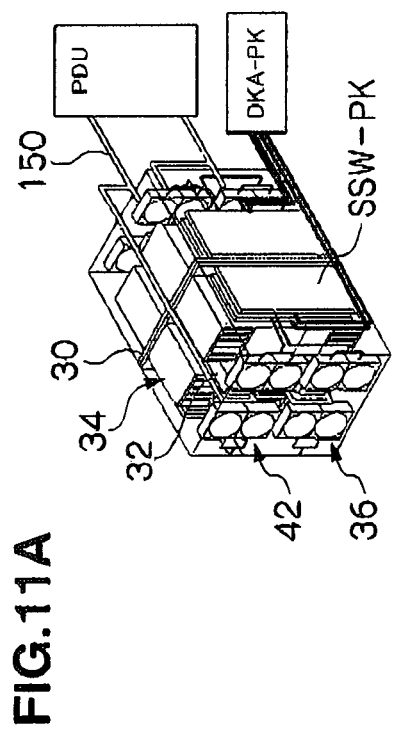
FIG. 11A is a perspective view.
Figure 11C:
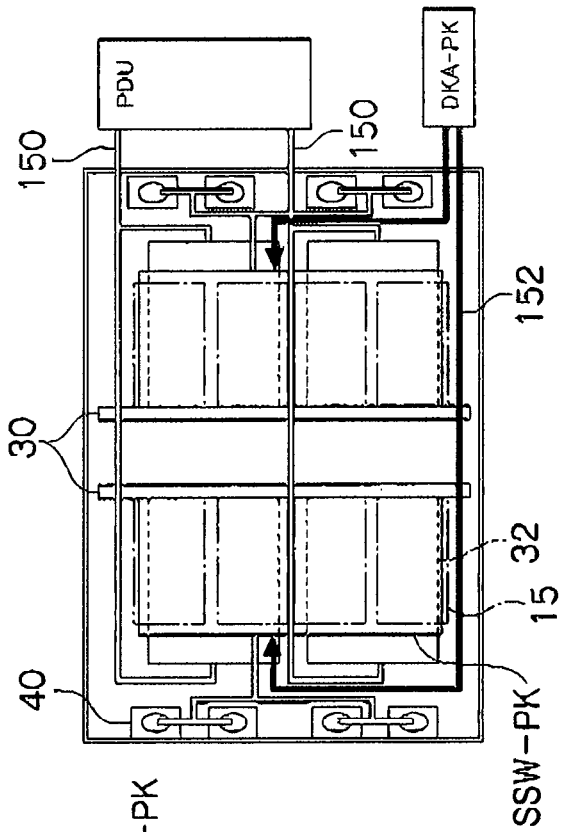
FIG. 11B is a front view and FIG. 11C is a side view explaining a power supply system and a signal system for the fans and hard disk drives.
Figure 11B:
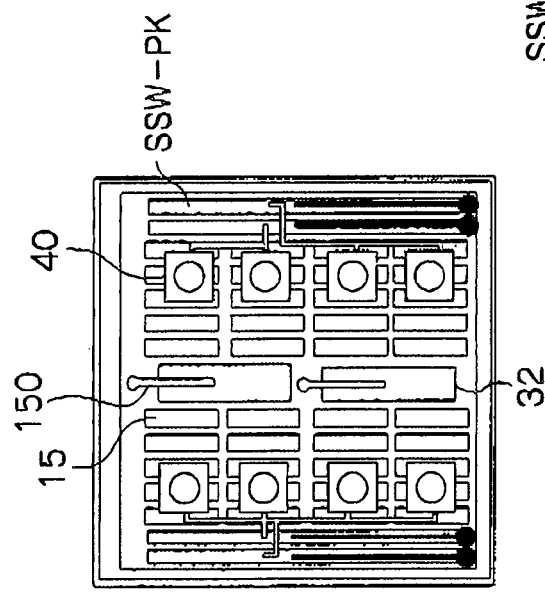

FIGS. 11A to 11C are diagrams explaining a power supply system and a signal system for the fans 40 and hard disk drives 15. FIG. 11A is a perspective view, FIG. 11B is a front view and FIG. 11C is a side view showing a pair of modules provided on the front side and rear side in the housing 20.

A PDU is a unit for distributing an external power source and is mounted on the rear side in the housing 20. Power is supplied from the PDU to the power source units 32 via power source cables 150. As is clear from FIGS. 11A and 11C, the power source cables 150 from the PDU to the front-side power source units 32 are extended through the pair of platters 30 and extended above the front-side and rear-side power source units 32 and are connected to a front surface of the front-side power source unit 32.

SSW-PKs (Saw Switch Packages) are control circuits for supplying power and control signals to the hard disk drives (DKU) 15 and the fans 40. The control circuits are mounted on the platters 30 and power is supplied from the platter 30 to the SSW-PKs. Two SSW-PKs are provided on each lateral surface of the front-side and rear-sire modules. As shown in FIG. 11B, each SSW-PK is connected to the fans 40 in each fan unit 42.

A DKA-PK (Disk Array-Package) is an interface that is provided on the rear side of the control unit (DKC) and connects the DKC and the hard disk drive units (DKU) 15. Signal connection between the DKC and DKU is provided via the SSW-PKs and platter 30. Signal cables 152 from the DKA-PK to the SSW-PKs provided on the front side are extended below the front-side SSW-PKs and rear-side SSW-PKs and connected to the front surfaces of the front-side SSW-PKs.

Figure 12:
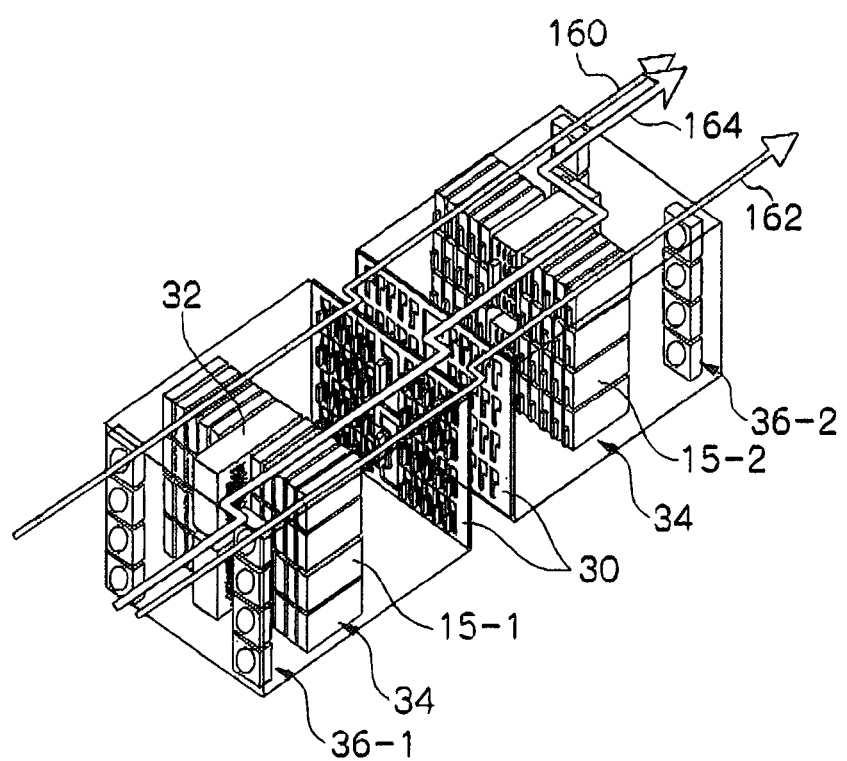
FIG. 12 is a schematic diagram explaining a flow path for the air introduced from the outside in the housing by the cooling device on the front side in the housing.

As shown in FIG. 12, flow paths 160 and 162 for the outside air introduced into the housing 20 by the cooling device 36-1 on the front side in the housing 20 are formed in such a manner that the air passes around the front-side hard disk drives 15-1, passes, via the platter 30, around the rear-side hard disk drives 15-2, and then is expelled outside the housing 20 from the cooling device 36-2 on the rear side.

As shown in FIG. 10, notches denoted by the reference numeral 121 are formed in circumferential portions of the hard disk drive sockets 122 in the platter 30 so that the air from the outside can pass through the platter 30.

Notches 123 are formed also near the power source unit sockets 120 in the platter 30. A flow path 164 for the outside air supplied from the front-side cooling device 36-1 is formed in such a manner that the air is introduced to the lateral surfaces of the power source units 32, passes through the notches 123 around the power source unit sockets 120, reaches the lateral surfaces of the rear-side power source units 32, and then is expelled from the rear-side cooling device 36-2. The rear-side platter 30 is provided with the notches the same as those in the front-side platter 30.

The total area of the notches formed in the platters 30 is preferably large in order to reduce resistance for the airflow. However, on the other hand, too large a total area of the notches will cause a reduction in the strength of the platter 30 and will be an obstacle to the power supply circuit patterns and signal circuit patterns formed on the platters 30. Accordingly, a preferable size for the notches may be determined in consideration of a balance of both the above aspects.

FIGS. 13A and 138 are schematic diagrams showing temperature change in the airflow supplied from the outside into the storage apparatus 10. As shown in FIG. 13A, the temperature of an airflow 170 that was supplied from the front-side fan 42-1 and passed around the front-side hard disk drives 15-1 to the rear-side fan 42-2 has increased due to the hard disk drives 15-1.

The airflow 170 then reaches the rear-side hard disk drives 15-2, so cooling performance for the rear-side hard disk drives 15-2 may not be perfectly sufficient.

As shown in FIG. 12, the plurality of fans 40 in the cooling devices 36 are arranged so that the height of the cooling devices 36 becomes higher than the total height of the plurality of aligned hard disk drives 15. With this arrangement, as shown in FIG. 13A, an airflow 172 that has passed above and below the front-side hard disk drives 15-1 and not by the lateral surfaces of the front-side hard disk drives 15-1, i.e., the airflow 172 that has not been heated by the hard disk drives 15-1, can be used for cooling the rear-side hard disk drives 15-2.

The airflow 172 hits against upper and lower ends 171 that are not provided with the notches in the platter 30 shown in FIG. 10, is guided by the notches 121 around the hard disk drive sockets 122 and joins with the airflow 170 when passing through the notches 121.

Accordingly, the airflow 170 passes through the rear-side hard disk drives 15-2 while being cooled by the airflow 172, so cooling efficiency for the rear-side hard disk drives 15-2 is increased.

Alternatively, as shown in FIG. 13B, the front-side had disk drives 15-1 and the rear-side hard disk drives 15-2 may be offset in the vertical direction of the housing 20 in order to separate the air 174 passing through the front-side hard disk drives 15-1 from the air 176 passing through the rear-side hard disk drives 15-2. This configuration can be realized by providing a partition 178 between the front-side hard disk drives 15-1 and the rear-side hard disk drives 15-2 for separating the air 174 and the air 176.

By mounting the hard disk drives 15 from the front side and rear side of the housing 20, RAID groups are formed by the front-side hard disk drives 15-1 and rear-side hard disk drives 15-2 as shown in FIGS. 14A and 14B. FIG. 14A shows the front view of the front-side module 24, and FIG. 14B shows the front view of the rear-side module 26. FIGS. 14A and 14B show that RAID-1 is configured by hard disk drives D01 to D04 and RAID-2 is configured by hard disk drives D05 to D08.

Other RAID groups are configured as shown in the management table in FIG. 15. This management table is recorded in a shared memory (not shown) in the DKC.

Figure 16B:
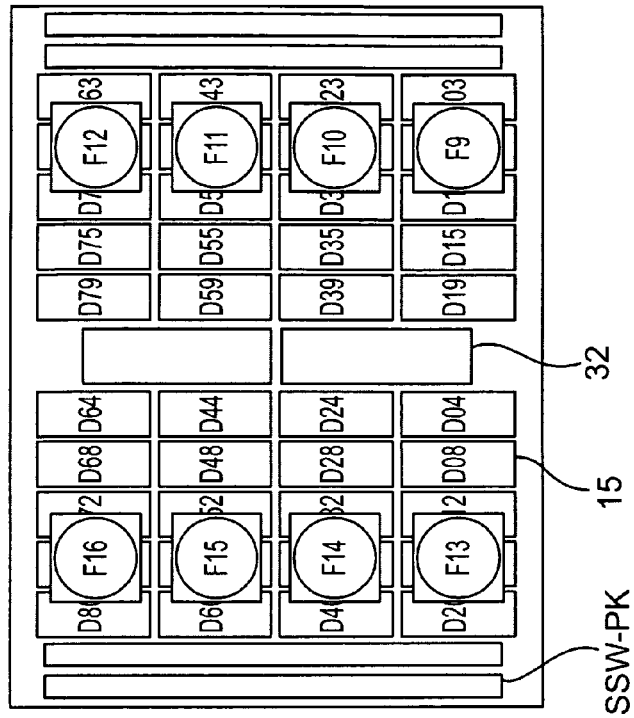
FIG. 16 is a front view and a rear view of the modules, explaining a positional relationship between the fans and the hard disk drive.
Figure 16A:
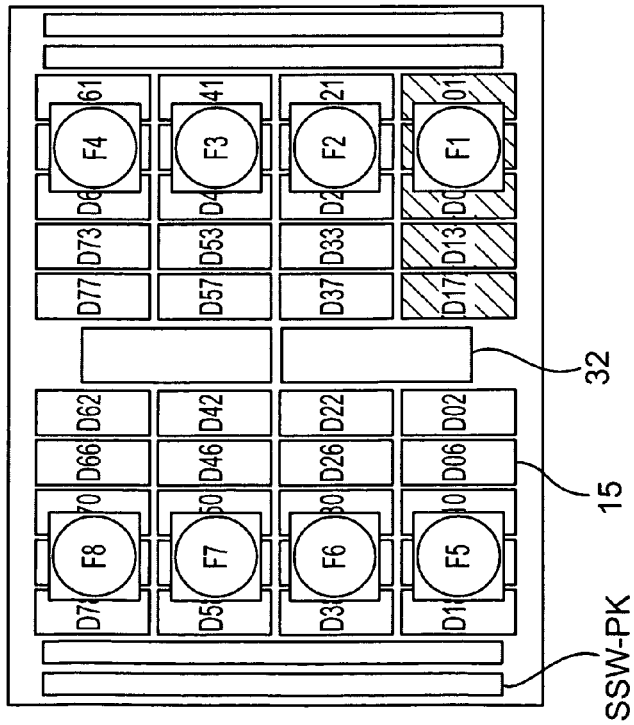

FIGS. 16A and 16B show a positional relationship between the fans (F1 to F13) and the hard disk drives 15. FIG. 16A shows a front view of the front-side module 24, and FIG. 16B shows a front view of the rear-side module 26.

A group is formed by a fan and hard disk drives 15 corresponding to this fan, and this relationship is recorded in a management table shown in FIG. 17 in the above-described shared memory. This management table shows, for example, that the hard disk drives mainly cooled by the fan F1 are D01, D05, D09, D13 and D17. As shown in FIG. 16, the fan F1 is arranged on the front side of the hard disk drives D01, D05, D09, D13 and D17.

FIG. 18 shows a management table for specifying hard disk drives configuring a RAID group (3D+1) and a fan to be stopped when a certain hard disk drive in that RAID group is locked out. This management table is also recorded in the shared memory.

Figure 19:
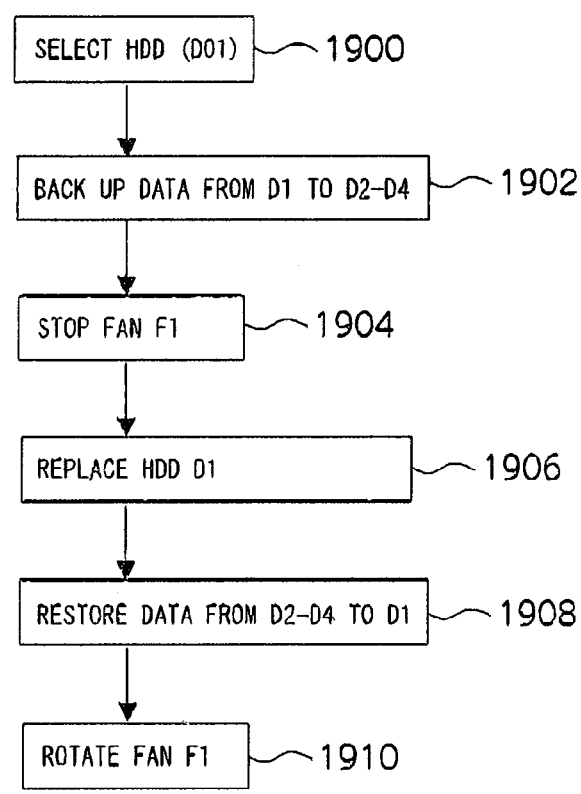
FIG. 19 is a flowchart explaining processing for locking out a hard disk drive.

FIG. 19 is a flowchart showing a procedure for locking out a hard disk drive and replacing it. The below description will use the hard disk drive D01 in FIG. 16 as an example.

When an administrator selects a hard disk drive D01 to be locked out using a management terminal (1900), this information is transmitted from the management terminal to the DKC via a management interface.

The DKC refers to the management table in FIG. 15 and backs up data in the hard disk drive D01 to another hard disk drive included in the RAID group (1902).

The DKC then refers to the management table shown in FIG. 18, determines a fan F1 corresponding to the hard disk drive D01 to be locked out and transmits a stop command for this fan to the control circuit SSW-PK that controls this fan, The SSSW-PK stops the fan F1 (1904).

The administrator receives a report indicating that the fan has been stopped replaces the hard disk drive D01 (1906), and inputs the completion of the replacement of the hard disk drive D01 using the management terminal. When receiving the report indicating the completion of the replacement of the hard disk drive D01, the DKC restores the data in another hard disk drive in the RAID group back to the hard disk drive D01 (1908). The DKC then transmits to the SSW-PK a command for restarting the stopped fan F1, and the stopped fan F1 accordingly restarts its rotation (1910).

While the front-side fan F1 is stopped, the air is supplied to the hard disk drives D05, D09, D13 and D17 from the rear side of the rack by a fan F9 placed opposite the fan F1 so the minimum required cooling for these hard disk drives is maintained.

The fan speed of the fan F9 may be increased while the fan F1 is stopped. When a fan on the rear side is stopped, the fan speed of the corresponding fan on the front side may be increased.

Alternatively, the cooling device may be slid relative to the module, or the rotation of a fan may be detected and stopped. Alternatively, the fan speed may be controlled by providing a temperature sensor in the chassis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus comprising:
a housing that includes a first area and a second area located to the rear of the first area, the housing allowing storage devices to be mounted respectively from the first area and the second area;
a first cooling device, provided on a first side facing the first area, including a first cooling unit and a second cooling unit that introduce outside air into the housing,
wherein the first cooling unit and the second cooling unit are moved independently of each other;
a second cooling device provided on a second side facing the second area, including a third cooling unit and a fourth cooling unit that expel to the outside of the housing the air introduced into the housing from the outside by the first cooling device,
wherein the third cooling unit and the fourth cooling unit are moved independently of each other;
a first drive circuit that drives the first cooling device;
a second drive circuit that drives the second cooling device;
a first device for moving the first cooling device between a first position where the first cooling device faces a storage device in the first area and a second position where the first cooling device opens the first side; and
a second device for moving the second cooling device between a third position where the second cooling device faces a storage device in the second area and a fourth position where the second cooling device opens the second side,
wherein a correspondence relationship is established between the first cooling unit and a plurality of first storage devices which are to be cooled by the first cooling unit, a correspondence relationship is established between the second cooling unit and a plurality of second storage devices which are to be cooled by the second cooling unit, a correspondence relationship is established between the third cooling unit and a plurality of third storage devices which are to be cooled by the third cooling unit, and a correspondence relationship is established between the fourth cooling unit and a plurality of fourth storage devices which are to be cooled by the fourth cooling unit,
wherein a redundant array of inexpensive disks (RAID) group is configured with one of the plurality of first storage devices, one of the plurality of second storage devices, one of the plurality of third storage devices and one of the plurality of fourth storage devices,
wherein the storage apparatus further includes a first power source unit arranged in the center of the first area and a second power source unit arranged in the center of the second area,
wherein the plurality of first and second storage devices are arranged on right and left sides of the first power source unit in the first area, respectively, and
wherein the plurality of third and fourth storage devices are arranged on right and left sides of the second power source unit in the second area, respectively.

2. The storage apparatus according to claim 1,
wherein the first device includes at least one of: a first mechanism that advances or retracts the first cooling device relative to the storage device in the first area that faces the first cooling device; and a second mechanism that rotates the first cooling device relative to the storage device in the first area that faces the first cooling device, and
wherein the second device includes at least one of: a third mechanism that advances and retracts the second cooling device relative to the storage device in the second area that faces the second cooling device; and a fourth mechanism that rotates the second cooling device relative to the storage device in the second area that faces the second cooling device.

3. The storage apparatus according to claim 1,
wherein the first cooling device is arranged rotatably relative to the housing in each of a right end and a left end of the first area, and
wherein the second cooling device is arranged rotatably relative to the housing in each of a right end and a left end of the second area.

4. The storage apparatus according to claim 2,
wherein the second mechanism includes: a first shaft that rotatably supports the first cooling device with respect to the housing; and a first hinge mechanism provided between the first shaft and the first cooling device, and
wherein the fourth mechanism includes: a second shaft that rotatably supports the second cooling device with respect to the housing; and a second hinge mechanism provided between the second shaft and the second cooling device.

5. The storage apparatus according to claim 1,
wherein the first power source unit projects toward the first cooling device from the plurality of first and second storage devices in the first area, and
wherein the second power source unit projects toward the second cooling device from the plurality of third and fourth storage devices in the second area.

6. The storage apparatus according to claim 1, further comprising:

on a rear side in the first area, a first back board that is connected to the plurality of first and second storage devices and the first power source unit and is provided with a power supply circuit pattern from the first power source unit to the plurality of first and second storage devices; and on a rear side in the second area, a second back board that is connected to the plurality of third and fourth storage devices and the second power source unit and is provided with a power supply circuit pattern from the second power source unit to the plurality of third and fourth storage devices.

7. The storage apparatus according to claim 6, wherein the first back board and the second back board face each other in the housing.

8. The storage apparatus according to claim 1, wherein a flow path, for the air from the outside, formed between the first cooling unit and the third cooling unit includes a first flow path that passes through the plurality of third and fourth storage devices on a rear side in the housing without passing through the plurality of first and second storage devices on a front side in the housing.

9. The storage apparatus according to claim 1, wherein a flow path, for the air from the outside, formed between the first cooling unit and the third cooling unit includes a first flow path that passes through the plurality of third and fourth storage devices on a rear side in the housing without passing through the plurality of first and second storage devices on a front side in the housing, and includes a second flow path in which the air passes through the plurality of first and second storage devices on the front side in the housing and then joins the air flowing in the first flow path and then passes through the plurality of third and fourth storage devices on the rear side in the housing.

10. The storage apparatus according to claim 1, further comprising:
a memory configured to store a management table containing a correspondence relationship between said storage devices and said cooling units,
wherein when replacing one of said storage devices, a cooling unit corresponding thereto is stopped by referring to the management table.

11. A cooling method for a storage apparatus, the storage apparatus comprising a housing that includes a first area and a second area located to the rear of the first area, the housing allowing storage devices to be mounted respectively from the first area and the second area, the storage apparatus further comprising a first cooling device, provided on a first side facing the first area, including a first cooling unit and a second cooling unit, a second cooling device provided on a second side facing the second area, including a third cooling unit and a fourth cooling unit, a first drive circuit that drives the first cooling device, a second drive circuit that drives the second cooling device, a first device, and a second device, the method comprising:
introducing, by the first cooling unit and the second cooling unit, outside air from a front side of the housing into the housing,
wherein the first cooling unit and the second cooling unit are moved independently of each other;
expelling, by the third cooling unit and the second cooling unit, the air introduced into the housing from the outside by the first cooling device to the outside of the housing,
wherein the third cooling unit and the fourth cooling unit are moved independently of each other;
moving, by the first device, the first cooling device between a first position where the first cooling device faces a storage device in the first area and a second position where the first cooling device opens the first side; and
moving, by the second device, the second cooling device between a third position where the second cooling device faces a storage device in the second area and a fourth position where the second cooling device opens the second side,
wherein a correspondence relationship is established between the first cooling unit and a plurality of first storage devices which are to be cooled by the first cooling unit, a correspondence relationship is established between the second cooling unit and a plurality of second storage devices which are to be cooled by the second cooling unit, a correspondence relationship is established between the third cooling unit and a plurality of third storage devices which are to be cooled by the third cooling unit, and a correspondence relationship is established between the fourth cooling unit and a plurality of fourth storage devices which are to be cooled by the fourth cooling unit,
wherein a redundant array of inexpensive disks (RAID) group is configured with one of the plurality of first storage devices, one of the plurality of second storage devices, one of the plurality of third storage devices and one of the plurality of fourth storage devices,
wherein the storage apparatus further includes a first power source unit arranged in the center of the first area and a second power source unit arranged in the center of the second area,
wherein the plurality of first and second storage devices are arranged on right and left sides of the first power source unit in the first area, respectively, and
wherein the plurality of third and fourth storage devices are arranged on right and left sides of the second power source unit in the second area, respectively.

12. The cooling method according to claim 11, further comprising:
generating a first airflow for supplying the air introduced from the outside to storage devices facing the front side of the housing;
creating a second airflow that supplies the air introduced from the outside directly to storage devices facing a rear side of the housing not via the storage devices facing the front side of the housing; and
expelling the first airflow and the second airflow to the outside of the housing.

13. The cooling method according to claim 11, further comprising:
supplying the first airflow to the storage devices facing the rear side of the housing; and
joining the first airflow with the second airflow before supplying the first airflow to the storage devices facing the rear side of the housing.

* * * * *